(12) United States Patent
Boese

(10) Patent No.: US 7,555,888 B1
(45) Date of Patent: Jul. 7, 2009

(54) PULL TYPE PEPPER HARVESTER

(76) Inventor: Aaron M. Boese, 2403 Adams Blvd., Saginaw, MI (US) 48602

( * ) Notice: Subject to any disclaimer, the term of this patent is extended or adjusted under 35 U.S.C. 154(b) by 0 days.

(21) Appl. No.: 12/050,792

(22) Filed: Mar. 18, 2008

(51) Int. Cl.
*A01D 45/00* (2006.01)
(52) U.S. Cl. .................................. 56/327.1; 56/328.1
(58) Field of Classification Search ............... 56/327.1, 56/328.1
See application file for complete search history.

(56) References Cited

U.S. PATENT DOCUMENTS

| | | | |
|---|---|---|---|
| 2,285,678 A | | 6/1942 | Overstrom et al. |
| 2,477,006 A | | 7/1949 | Pierson |
| 2,874,528 A | | 2/1959 | Esch |
| 2,966,263 A | | 12/1960 | Holmes |
| 3,200,888 A | | 8/1965 | Lehde et al. |
| 3,770,123 A | | 11/1973 | Mraz |
| 4,196,570 A | * | 4/1980 | Rodriguez .................... 56/126 |
| 4,249,366 A | | 2/1981 | Dolberg et al. |
| 4,257,217 A | | 3/1981 | McClendon |
| 4,257,218 A | | 3/1981 | McRobert |
| 4,339,906 A | | 7/1982 | Chichkin et al. |
| 4,340,070 A | | 7/1982 | Keitel |
| 4,385,702 A | | 5/1983 | Lenker et al. |
| 4,395,867 A | | 8/1983 | Cooper et al. |
| 4,402,175 A | | 9/1983 | Watenpaugh |
| 4,471,876 A | | 9/1984 | Stevenson, Jr. et al. |
| 4,507,911 A | | 4/1985 | Wolf et al. |
| 4,697,406 A | | 10/1987 | Whitley |
| 4,739,608 A | | 4/1988 | Arnold |
| 4,757,673 A | | 7/1988 | Gayman |
| 5,174,093 A | * | 12/1992 | Rodriguez ................. 56/327.1 |
| 5,210,999 A | | 5/1993 | Cosimati |
| 5,287,687 A | | 2/1994 | Urich et al. |
| 5,329,753 A | | 7/1994 | Arnold et al. |
| 5,375,403 A | | 12/1994 | Collins et al. |
| 5,444,968 A | | 8/1995 | Barton |
| 5,709,071 A | * | 1/1998 | Cosimati .................... 56/327.1 |
| 5,784,869 A | | 7/1998 | Rayfield |
| 5,930,987 A | * | 8/1999 | Urich et al. .................. 56/14.5 |
| 6,003,293 A | | 12/1999 | Boese |
| 6,199,703 B1 | | 3/2001 | Boese |
| 6,419,093 B2 | | 7/2002 | Boese |

FOREIGN PATENT DOCUMENTS

DE    4201067    7/1993

(Continued)

*Primary Examiner*—Alicia M Torres
(74) *Attorney, Agent, or Firm*—Robert L. Farris; Farris Law, P.C.

(57) ABSTRACT

The harvester frame is supported by laterally adjustable wheels. A hitch draft tube connects the frame to a tractor. A transverse horizontal shaft is journaled on a frame mast. A header frame rear is attached to the horizontal shaft. Ground engaging wheels support the header front. Two spaced apart helix assemblies on the header frame are rotated to remote fruit from plants. The helix forward ends work at ground level. Helix rear ends are elevated. A header lift bar is journaled on the horizontal shaft. A header lift cylinder pivots a free end of the lift bar into engagement with the header frame and lifts header wheels from the ground. Conveyors convey crop material from the helix assemblies to a fruit cleaning assembly with a forward end attached to the frame mast. Separated and cleaned fruit is received from the cleaning assembly and discharged from the harvester.

6 Claims, 9 Drawing Sheets

FOREIGN PATENT DOCUMENTS

| | | |
|---|---|---|
| EP | 0450290 | 10/1991 |
| EP | 584965 A1 | 3/1994 |
| RU | 2004953 | 12/1993 |
| SU | 858632 | 8/1981 |
| SU | 888845 | 12/1981 |
| SU | 897153 | 1/1982 |
| SU | 1242027 | 7/1986 |
| SU | 1323020 | 7/1987 |
| SU | 1516048 | 10/1989 |
| WO | 83/02408 | 7/1983 |

* cited by examiner

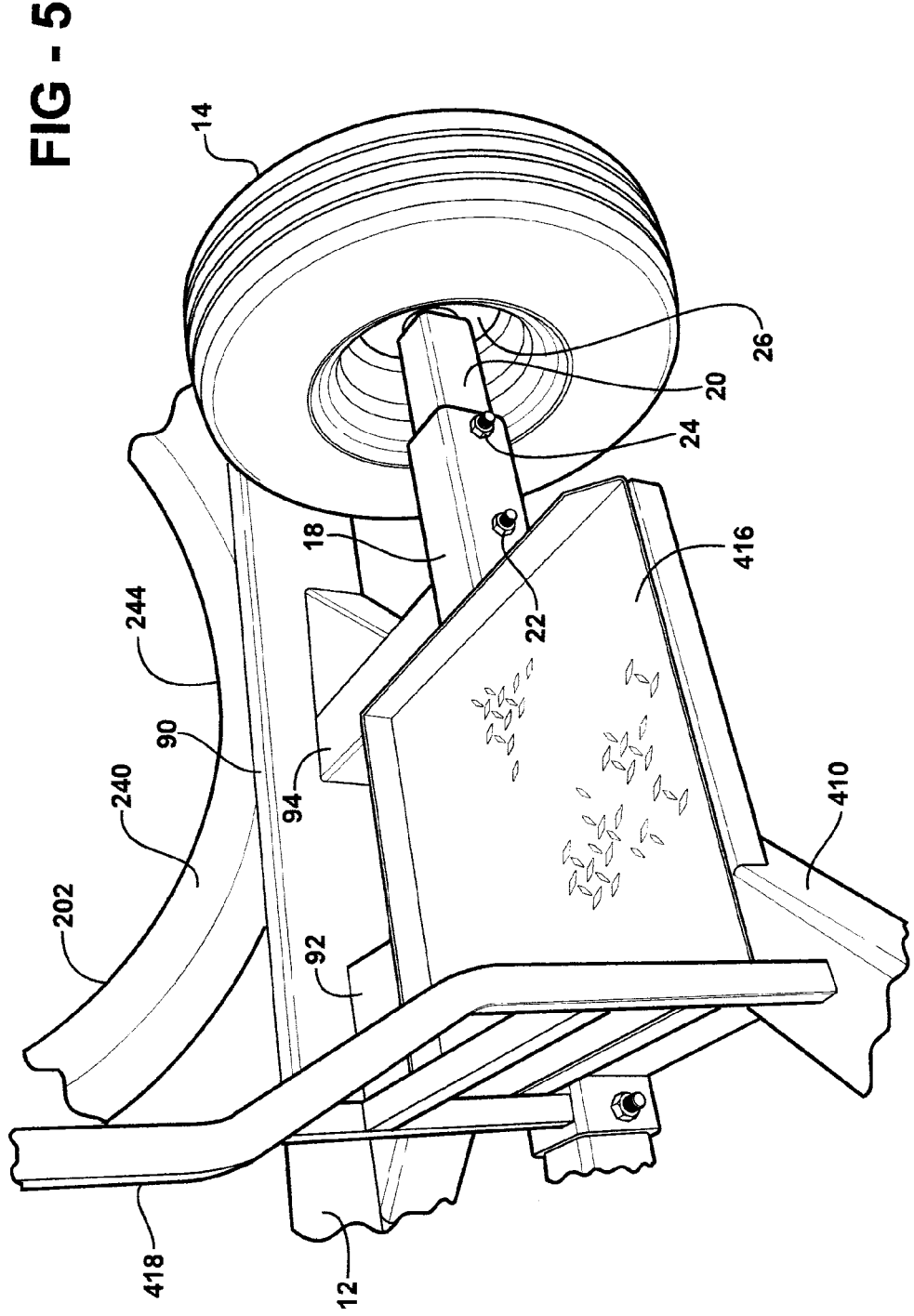

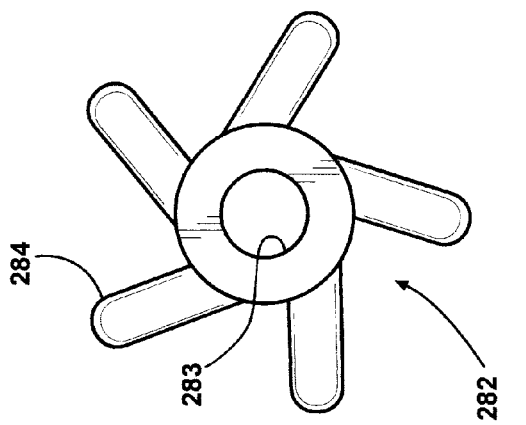
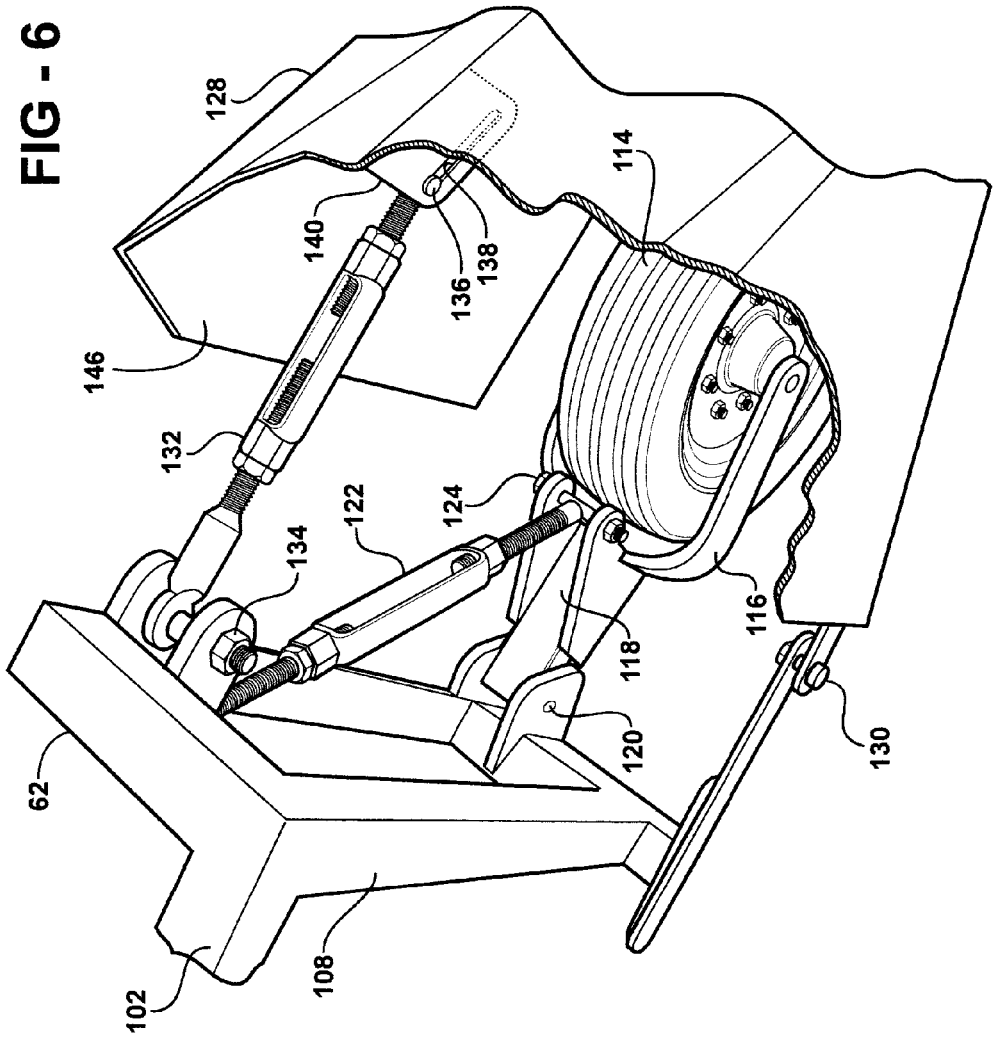

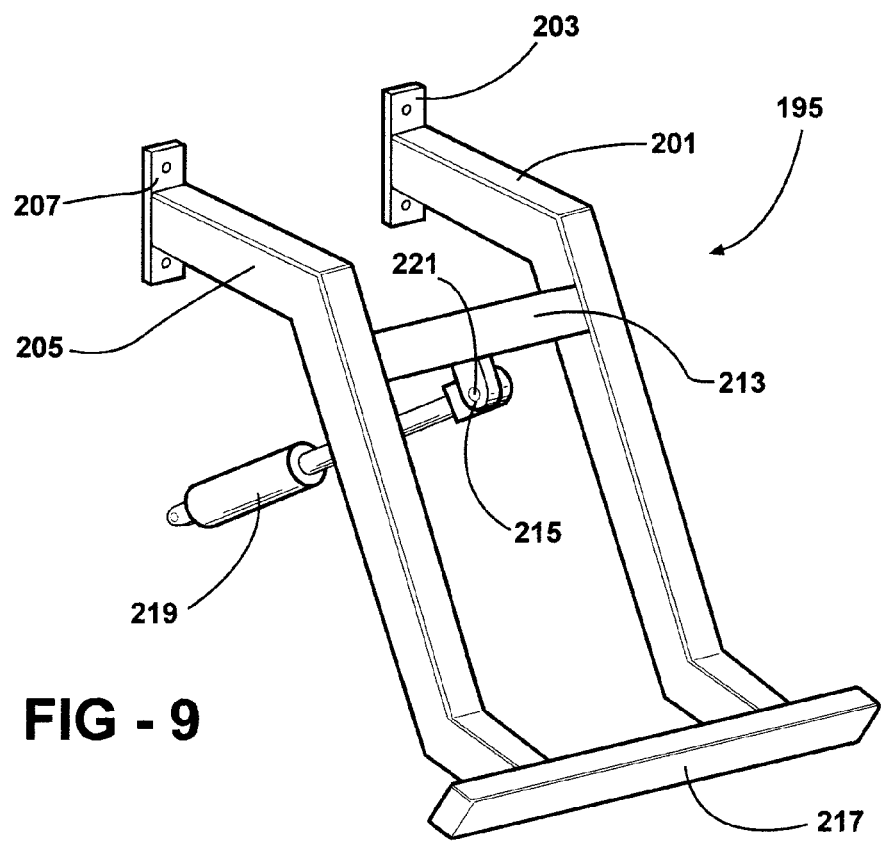
FIG - 9
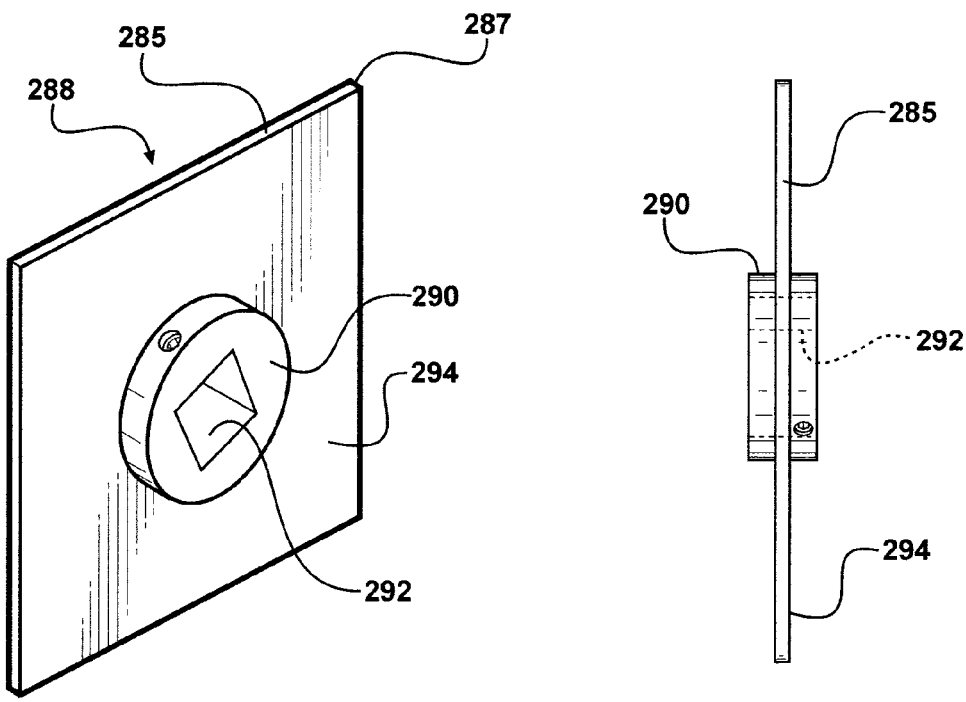
FIG - 11  FIG - 12

PULL TYPE PEPPER HARVESTER

TECHNICAL FIELD

The tractor pulled pepper harvester removes mature peppers from a single row of pepper plants, leaves the pepper plants standing and separates peppers from foreign material.

BACKGROUND OF THE INVENTION

Peppers are harvested by hand pickers as well as by machines. Machine pickers reduce the cost of picking thereby making peppers available for consumption at a relatively low cost. Hand pickers are freed for higher paying tasks that can not be accomplished by machines.

Crops are harvested by whole crop harvesters that remove the entire plant from the roots and run the plant material through a separating and cleaning assembly. Whole crop harvesters have not been acceptable for peppers. They leave too much plant material mixed with dried peppers. Fresh peppers mature over a period of time. As a result a substantial portion of a crop would be lost if fresh peppers of various varieties were harvested by a whole crop harvester.

Machine harvesters for peppers that remove the fruit and leave the plant standing have been used for some years. These harvesters harvest the fruit and leave most of the stalks, stems and leaves in the field when harvesting fresh peppers as well as dried peppers.

Successful self propelled mechanical harvesters that remove fruit from two or more rows of plants simultaneously are known. The plant rows are generally a minimum of 400 meters long. The machines require a uniform distance between rows. Relatively large transport equipment is required to transport the fruit from the field. The transport equipment and harvesters require substantial space to turn around at each end of the rows. These machines tend to lose too much crop in high production areas where hand pickers have been used for centuries, and agronomy practices have not been modified to accommodate relatively large machines. Farms as well as individual fields are often too small to justify the cost of a self propelled harvester and the transportation systems required to move harvested fruit from a high capacity harvester to a processing facility.

SUMMARY OF THE INVENTION

The pull type pepper harvester has a frame. A right side axle tube and spindle is telescopically received in a horizontal transverse tube of the frame and locked in one of a plurality of selectable positions relative to the frame. A left side axle tube and spindle is telescopically received in the horizontal transverse tube of the frame and locked in one of a plurality selectable positions relative to the frame. A right tire and wheel is journaled on the right side axle tube and spindle. A left tire and wheel is journaled on the left side axle tube and spindle.

A hitch assembly includes a main draft tube with a draft tube rear portion pivotally attached to the frame by at least one pin for pivotal movement about a vertical axis. A draft tube forward portion is adapted to be connected to a tractor. An adjustable length strut is pivotally attached to the frame and to the main draft tube. The adjustable length strut is extended to increase length to hold the main draft tube in a harvesting position. The adjustable length strut is retracted to decrease length and hold the main draft tube in a transport position.

A header assembly includes a rigid header frame with a header frame rear portion pivotally attached to the frame for pivotal movement about a transverse horizontal axis. A left side ground engaging tire and wheel is mounted on a header frame front portion of the rigid header frame adjacent to a rigid header frame left side. The left side ground engaging tire and wheel is vertically adjustable relative to the rigid header frame. A right side ground engaging tire and wheel is mounted on the header frame front portion of the rigid header frame adjacent to a rigid header frame right side. The right side ground engaging tire and wheel is vertically adjustable relative to the rigid header frame. A left snout assembly and a right snout assembly are pivotally mounted on the rigid header frame. A left plant feed assembly and a right plant feed assembly, mounted on the rigid header frame front portion, cooperate with each other to urge crop plants from the left snout assembly and the right snout assembly to the rear relative to the rigid header frame. A left helix assembly is journaled on the rigid header frame by a left rear bearing and extends downward and forward from the left rear bearing. A right helix assembly is journaled on the rigid header frame by a right rear bearing and extends downward and forward from the right rear bearing. The right helix assembly is parallel to the left helix assembly and spaced from the left helix assembly. A left expanded metal grate under the left helix assembly has an outboard edge fixed to the rigid header frame and an inboard metal edge that forms the left side of a plant passage through the header assembly. A right expanded metal grate under the right helix assembly has an outboard edge fixed to the rigid header frame and an inboard metal edge that forms a right side of the plant passage through the header assembly. A left continuous belt and slat conveyor is mounted on the rigid header frame to the left side of the left helix assembly. A right continuous belt and slat conveyor is mounted on the rigid header frame to the right side of the helix assembly. A left expanded metal side panel, a right expanded metal side panel, and at least one expanded metal top cover retain and deflect fruit separated from plants by the left helix assembly and the right helix assembly into the left continuous belt and slat conveyor and into the right continuous belt and slat conveyor.

A header lift assembly includes a header hydraulic lift cylinder connected to the frame and to the rigid header frame through a linkage.

A drum conveyor includes a cylindrical tube. A conveyor front wall with a circular aperture is fixed to the cylindrical tube. A conveyor rear wall, with a circular aperture is fixed to the cylindrical tube. A plurality of divider plates are connected to the conveyor front wall and the conveyor rear wall to form a plurality of fruit receiving pockets. The fruit receiving pockets receive fruit from the left continuous belt and slat conveyor and the right continuous belt and slat conveyor. A left side driven roller and a right side driven roller journaled on the frame support the cylindrical tube and rotate the cylindrical tube to elevate fruit in the plurality of fruit receiving pockets. A fixed arcuate plate closes a radially inward facing opening of the plurality of fruit receiving pockets from a location past a fruit receiving location to a fruit discharge position.

A fruit separating and cleaning assembly includes a left vertical side wall and a right vertical side wall that extend through the circular aperture through the conveyor rear wall and through the circular aperture through the front wall of the drum conveyor, clamped to a vertical frame portion of frame and extending rearwardly from the vertical frame portion. A transverse rear wall is fixed to the left vertical side wall and to the right vertical side wall. A hood covers the area between the left vertical side wall and the right vertical side wall and extends forward from the transverse rear wall. A plurality of horizontal star wheel shafts, each of which is journaled on the left vertical side wall and the right side wall, are parallel to each other. A plurality of star wheels are mounted on each of the plurality of star wheel shafts. A fan is connected to the left vertical side wall and the right vertical side wall and discharges air through fruit discharged from the drum conveyor and under the hood. A plurality of plate shafts are journaled on the left vertical side wall and the right vertical side wall below the plurality of horizontal star wheel shafts. A plurality of plate assemblies are mounted on each of the plurality of plate shafts. A plate of each of the plurality of plate assemblies on each of the plurality of plate shafts extends between the plates of the plurality of plate assemblies mounted on each adjacent one of the plurality plate shafts. An endless drive chain driven by a hydraulic motor drive sprocket is trained around a star wheel driven sprocket on each of the plurality of star wheel shafts and a plate shaft driven sprocket on each of the plurality of plate shafts. A trash discharge passage is provided between a rear star wheel of the plurality of horizontal star wheel shafts and the transverse rear wall.

A transverse conveyor assembly, mounted on the frame below a forward plate shaft of the plurality of plate shafts, includes a transverse conveyor discharge end. A fruit discharge conveyor is pivotally mounted on the frame for pivotal movement about a vertical discharge conveyor axis. A discharge conveyor hopper is positioned under the transverse conveyor discharge end. A hydraulic cylinder connected to the frame and the fruit discharge conveyor pivots the fruit discharge conveyor about the vertical discharge conveyor axis.

The header lift assembly includes the header lift assembly with a lift cylinder rod end pivotally connected to a lift bar assembly. The lift bar assembly has a lift bar upper end journaled of a transverse horizontal shaft with the transverse horizontal axis. A lower end cross bar of the lift bar assembly engages the rigid header frame during extension of the header hydraulic lift cylinder and lifts the left side ground engaging tire and wheel and the right side ground engaging tire and wheel from the ground. Retraction of the header hydraulic lift cylinder lowers the left side ground engaging tire and wheel and the right side ground engaging wheel and tire to the ground. Continued retraction of the header hydraulic cylinder disengages the lift bar assembly from the rigid header frame thereby permitting the rigid header to pivot downward as well as upward as the harvester moves along a row of plants.

BRIEF DESCRIPTION OF THE DRAWINGS

Presently preferred embodiments of the invention are disclosed in the following description and in the accompanying drawings, wherein:

FIG. 5 is a perspective view of the right hand rear wheel and a portion of the frame with parts broken away;

FIG. 6 is a perspective view of the right snout assembly and the right hand harvesting head support wheel;

FIG. 9 is a perspective view of the header lift bar assembly and the lift cylinder.

FIG. 10 is an enlarged side elevational view of a star wheel;

FIG. 11 is a perspective view of a first side of a plate assembly; and

FIG. 12 is a front elevation view of a plate assembly.

DETAILED DESCRIPTION OF THE PREFERRED EMBODIMENTS

The terms left hand and right hand are as seen by a person standing behind the machine and facing in the direction of normal forward movement. The frame is constructed from rectangular tubular steel for strength. The frame could be fabricated from beams that are not tubular or rectangular.

Figure 7:
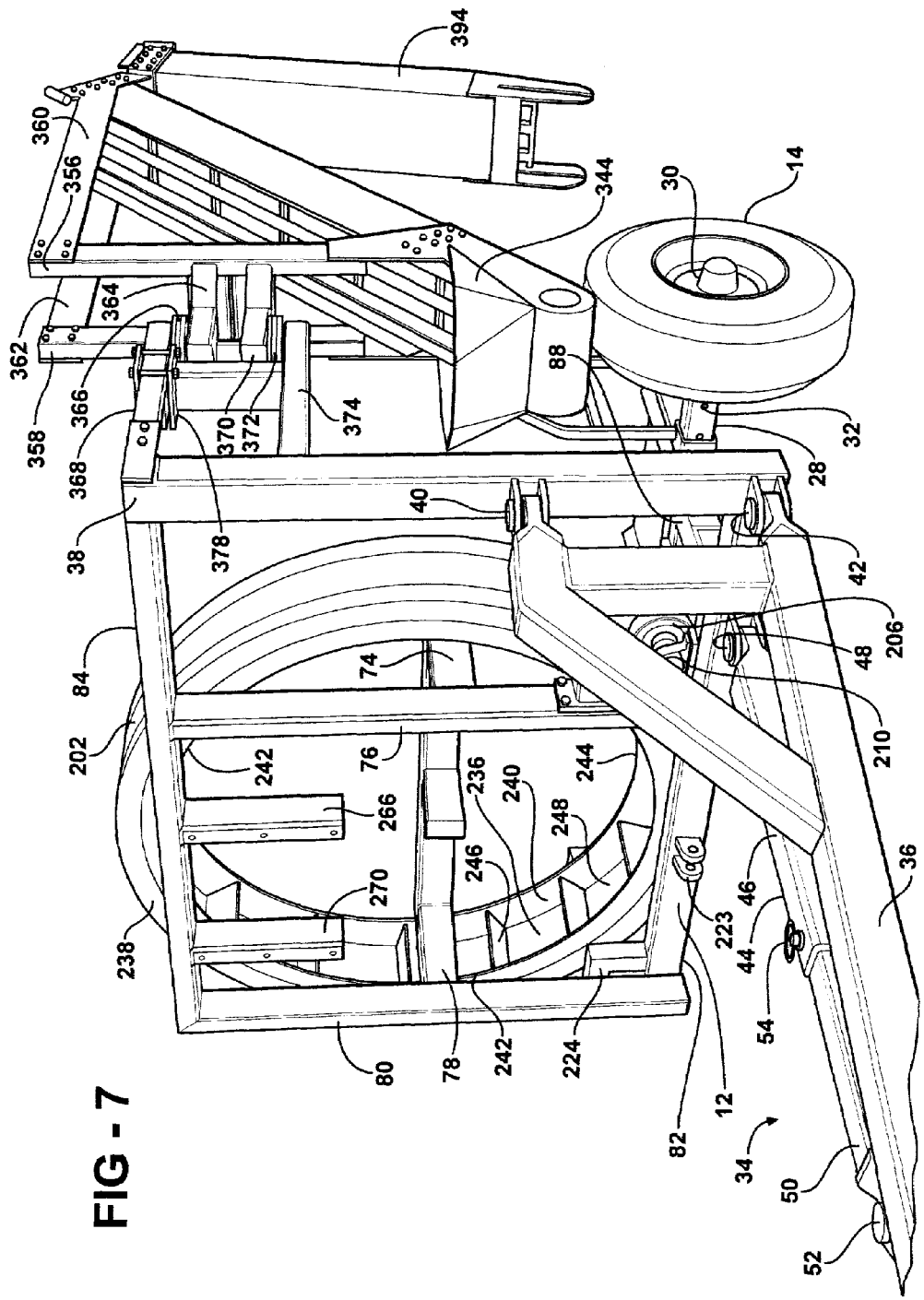
FIG. 7 is a perspective view of the frame front and left side with parts removed and parts broken away.
Figure 8:
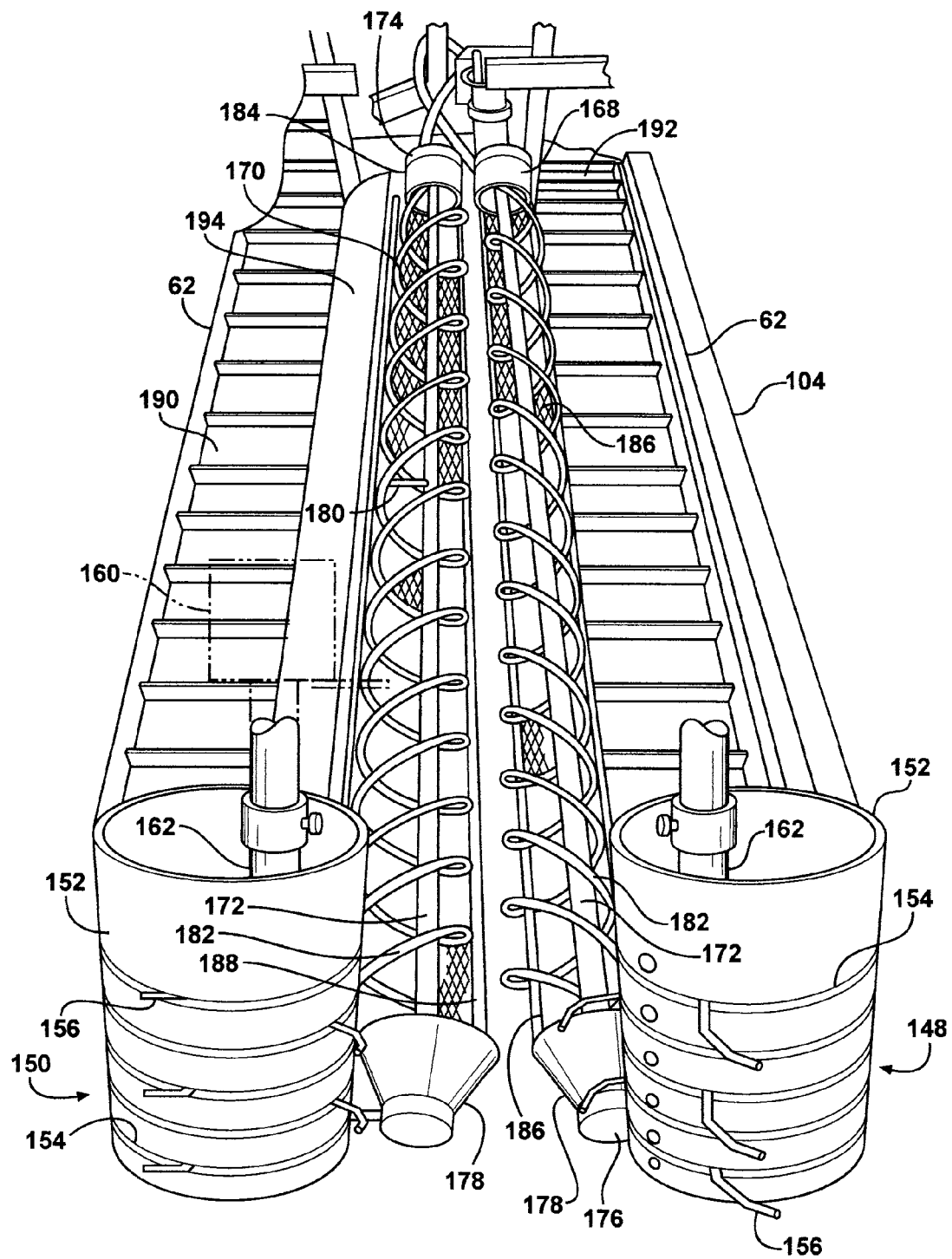
FIG. 8 is a front perspective view of the driven portions of the harvesting head with parts broken away.

The pull type pepper harvester 10 includes a frame 12. Two tires and wheel assemblies 14 are journaled on an axle assembly 16. The axle assembly 16 includes a horizontal transverse tube 18 that is fixed to the frame 12. A right side axle tube 20, shown in FIG. 5, is telescopically received in the horizontal tube 18 and locked in a selected position by bolts 22 and 24. A right spindle is fixed to an outboard end of the right side axle tube 20. A wheel hub 26 is journaled on the right spindle. A left side axle tube 28, shown in FIG. 7, is telescopically received in the horizontal tube 18 and locked in a selected position by bolts, the same as the bolts 22 and 24 that hold the right side axle tube 20. A left spindle is fixed to an outboard end of the left side axle tube 28. A wheel hub 30 is journaled on the spindle. A plurality of bores 32 are provided through the right side axle tube 20 and the left side axle tube 28 for adjusting the position of the tires and wheels assemblies 14 relative to the frame 12 as required to accommodate the row spacing of the pepper rows. The tire and wheel assemblies 14 are adjusted to roll on the ground between rows of plants.

A hitch assembly 34 includes a main draft tube 36. The main draft tube 36 is pivotally attached to a vertical tube 38 of the frame 12 by an upper pin 40 and a lower pin 42 for pivotal movement about a vertical axis. An adjustable length strut 44 includes a rear tube 46 that is pivotally attached to the frame 12 by a vertical pivot pin 48 that is horizontally spaced to the right from the lower pin 42. A forward tube 50 is telescopically received in the rear tube 46 and has a forward end pivotally attached to the main draft tube 36 by a vertical pivot pin 52. An adjustment pin 54 passes through a bore through the rear tube 46 and through one of a plurality of bores through the forward tube 50. The adjustment pin 54 can lock the adjustable length strut 44 in a retracted position in which the frame 12 follows directly behind a towing tractor for movement on a road. The adjustment 54 can also lock the adjustable strut 44 in an extended position in which the harvester 10 is substantially to the right of the towing tractor and the towing tractor is to the left of the row of peppers that is being harvested. There are preferably multiple bores through the forward tube 50 for the receiving adjustment pin 54 when the length of the adjustable length strut 44 is extended to accommodate towing tractors with different sizes and to position the wheels of the towing tractor between plant rows. A hitch (not shown) is secured to the forward end of the main draft tube 36. This hitch cooperates with a hitch portion on a tractor to connect the harvester 10 to a tractor.

A header assembly 60 includes a rigid header frame 62. The header frame 62 includes fore and aft extending beams 64 and 66. A transverse horizontal shaft 68 is secured to the rear portions of the fore and aft extending beams 64 and 66. The horizontal shaft 68 is journaled in bearing housings 70 and 72.

Figure 2:
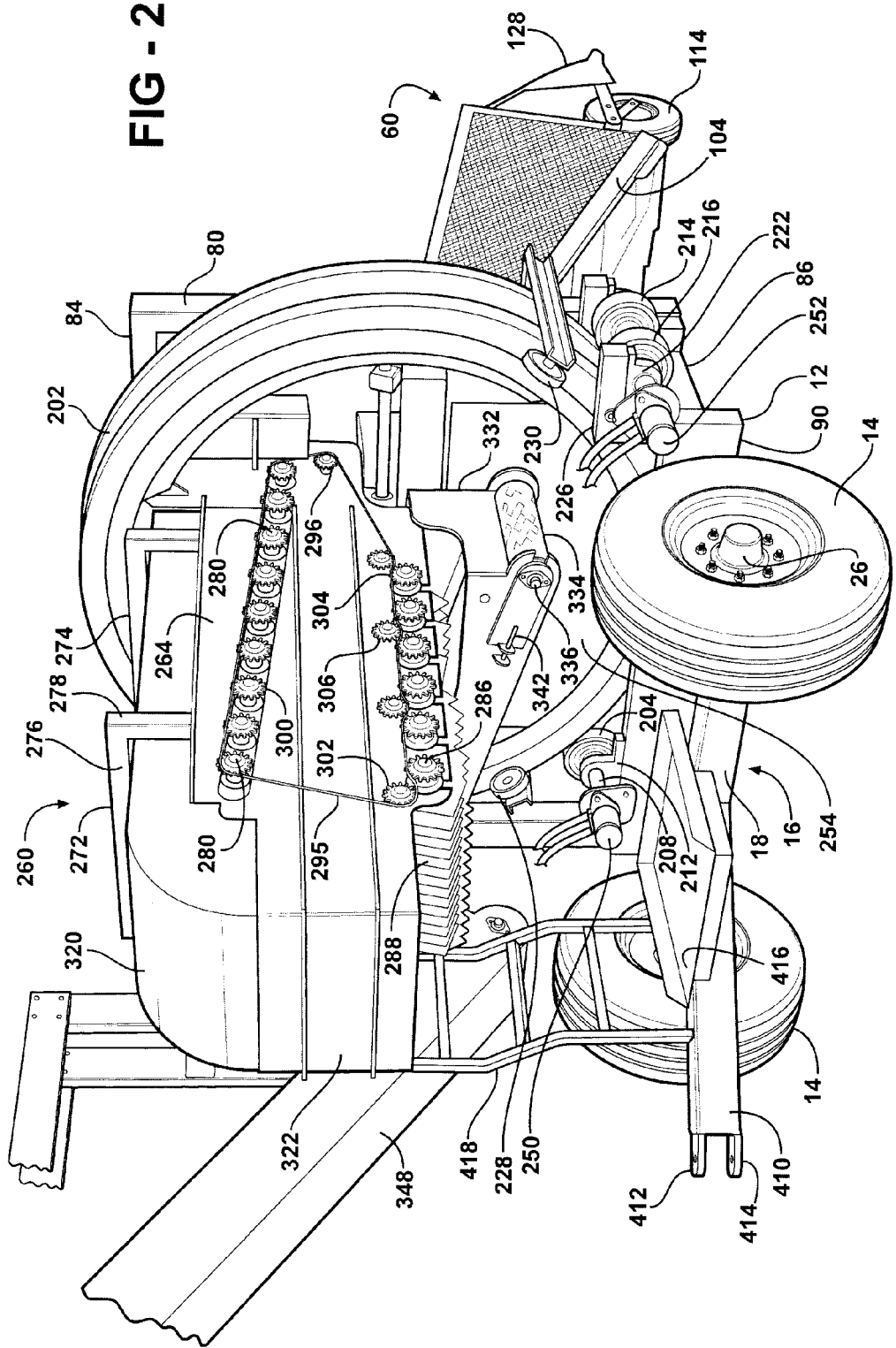
FIG. 2 is a perspective view showing the rear and right hand side of the harvester with parts broken away.

The bearing housing 70 is bolted to a horizontal member 74 that extends rearward from a vertical tube 76 of the frame 12. The bearing housing 72 is bolted to a horizontal member 78 that extends rearward from a vertical tube 80 of the frame 12. The lower ends of the vertical tubes 38, 76 and 80 are welded to a transverse horizontal tube 82 of the main frame 12. A horizontal transverse tube 84 is welded to the upper ends of the vertical tubes 38, 76 and 80. Fore and aft extending horizontal tubes 86 and 88, shown in FIGS. 2 and 7, are welded to the transverse horizontal tube 82. A rear transverse horizontal tube 90 is welded to the rear ends of the fore and aft extending horizontal tubes 86 and 88. The tube 90 is parallel to the tube 82. The horizontal transverse tube 18 is part of the axle assembly 16 that is supported by tire and wheel assemblies 14, is fixed to the rear transverse horizontal tube 90 by two fore and aft tubes 92 and 94.

The header assembly 60 includes a rigid header frame 62 with transverse header frame tubes 96 and 98 that are welded to fore and aft upper header tubes 100 and 102. Lower side rails 104, one of which is shown, are parallel to each other and connected together by front vertical tubes 106 and 108. Parallel rear vertical tubes 110 are each welded to an end of the transverse header frame tube 96 and to an end of one of the two lower side rails 104. The front vertical tubes 106 and 108 are substantially longer than the two rear vertical tubes 110. The first rear vertical tube 110 on the left side is welded to the fore and aft beam 64. The second rear vertical tube 110 on the right side is welded to the fore and aft beam 66.

The front portion of the rigid frame 62 is supported by a left ground engaging tire and wheel 112 and by a right ground engaging tire and wheel 114. The two tires and wheels 112 and 114, as shown in FIG. 6, are journaled on yoke assemblies 116. The yoke assemblies 116 supporting ground engaging tires and wheels 112 and 114 are identical. The yoke 116, as shown in FIG. 6 is welded to the forward end of a beam 118. The rear of the beam 118 is pivotally attached to the front of the rigid header frame 62 by a transverse horizontal pivot pin 120. A turn buckle assembly 122 is pivotally attached to the rigid header frame 62 and to the beam 118 by a bolt 124. Lengthening the turn buckle assembly 122 pivots the beam 118 about the pivot pin 120 thereby lowering the tire and wheel 114 relative to the rigid frame 62. Lengthening the turnbuckle assembly 122 raises the front of the header frame 62 and pivots the header frame and the transverse horizontal shaft 68 in the bearing housings 70 and 72. Shortening the turnbuckle assembly 122 pivots the transverse horizontal shaft 68 in the bearing housings 70 and 72 and lowers the front of the header frame 62. The turnbuckle assemblies 122 are adjusted so that both tires and wheels 112 and 114 support the front of the rigid header frame 62 when harvesting on level ground. On uneven ground the tire and wheel 112 or 114 on the highest field surface supports more or even all of the weight of the header assembly 60 that is supported by the two tires and wheels on level ground.

A left snout assembly 126 and the right snout assembly 128 are pivotally attached to the rigid header frame 62 by pivot pins 130 for pivotal movement about a transverse horizontal axis. A snout turnbuckle assembly 132 is pivotally attached to the frame 62 by a pivot pin 134. A slider assembly 136 on a forward end of the snout turnbuckle assembly 132 is slidably received in a slot 138 in a bracket 140 fixed to the snout assembly 128, as shown in FIG. 6. The turnbuckle assembly 132 is shortened to raise the leading end of the snout assembly 128. The turnbuckle assembly 132 is lengthened to lower the leading end of the snout assembly 128. A snout tip 142 is mounted on the leading end of the right snout assembly 128. A snout tip 144 is mounted on the leading tip of the left snout assembly 126. The turnbuckle assemblies 132 for each snout assembly 126 and 128 are adjusted so that the snout tips 142 and 144 slide along the surface of a field that is to be harvested. The snout tips 142 and 144 lift plant material and fruit that is on the ground between plant rows. The slider assembly 136 in the slot 138 is positioned in selected positions by the turnbuckle assembly 132 so that the snout tips 142 and 144 slide along the surface of a field and prevents the snout tips 142 and 144 from descending downward past a selected level. The slots 138 and the slider assembly 136 permit the snout tips to slide up over obstructions.

The snout walls 146 of the left and right snout assemblies 126 and 128 direct pepper plants and peppers laterally inward toward the center of the plant row and toward two plant feed assemblies 148 and 150. Each plant feed assembly 148 and 150 includes a generally cylindrical tube 152 with a substantially vertical axis. A plurality of vertically spaced apart horizontal slots 154 are provided through the wall of each of the cylindrical tubes 152. Plant material feed fingers 156 are secured to vertical shafts 162 and driven by hydraulic motors 158 and 160. The hydraulic motors 158 and 160 and the vertical shafts that they drive are offset from the vertical axes of the cylindrical tubes 152 toward each other. The feed fingers 156 mounted on the vertical shafts 162 engage plant material passing between the walls 146 of the left and right snout assemblies 126 and 128 and move it gently between the cylindrical tubes 158. The feed fingers 156 retract into the inside of the cylindrical tubes 152 after plant material is conveyed between both of the cylindrical tubes. The slots 154 end in the portions of cylindrical tubes 152 in which the feed fingers 156 are entirely inside the tubes. The feed fingers 156 pass through slots 154 and extend out of the cylindrical tubes 152 near the front edge of the cylindrical tubes. Generally flat plates 164 with slots 166 guide plant material from the left and right snout assemblies to the cylindrical tubes 152.

The header assembly 60 includes a left helix assembly 168 and a right helix assembly 170 for harvesting fruit from plants. Each helix assembly 168 and 170 includes a central shaft 172 that is journaled on the rigid header frame 62 by a rear bearing 174 and a front support bearing 176. A conical member 178 is fixed to the lower forward end of each central shaft 172. Radial arms 180 are fixed to each central shaft 172. A rod is bent to form a helix 182 and welded to the free ends of the radial arms 180. The radial arms 180 have the same length. The central shaft 172 is in the center of the helix 182. The lower end of each helix 182 is welded to the conical member 178. The upper end of each helix 182 is welded to a cylindrical tube 184 secured to the upper end of the central shaft 172. The two helix assemblies 168 and 170 are driven in a timed relation relative to each other by a continuous roller chain trained around sprockets on the upper end of each central shaft 172 and a hydraulic motor drive (not shown). An expanded metal grate 186 with an inboard metal edge 188 is mounted on the frame 62 under each helix assembly 168 and 170. The space between the two inboard metal edges 188 is for the passage of plant stalks, stems and leaves. The outboard edges of each of the expanded metal grates 186 are fixed to the rigid header frame 62. A right continuous belt and slat conveyor 190 is mounted on the header frame 62 outboard of right helix assembly 170. A left continuous belt and slat conveyor 192 is mounted on the header frame 62 outboard of the left helix assembly 168. A plate 194 is provided between the right helix assembly 170 and the belt and slat conveyor 190. The plate 194 permits lateral movement of the right helix assembly 170 to adjust the space between the left helix assembly 168 and the right helix assembly. Minor adjustments in the space between the left helix assembly 168 and the right helix assembly 170 are made to accommodate changes in crop conditions. These changes may keep the right helix assembly 170 parallel to the left helix assembly 168. The adjustable right helix assembly 170 may also be adjusted to vary the space between the right helix assembly and the left helix assembly 168 from the lower forward ends to the upper rear ends of the two helix assemblies. These adjustments will maintain the left helix assembly 168 and the right helix assembly 170 and the axies of their central shafts 172 in a common helix plane.

The helix assemblies 168 and 170 are rotated so that the helix bars 182 on both helix assemblies closest to the row of plants both move upwardly, contact fruit, move the fruit upward and rearward, separate mature fruit from the plant and leave fruit such as peppers that are immature on the plant to continue to grow and mature. Dry chili peppers are harvested only one time. The helix bars 182 tend to throw peppers upward and outward. To prevent loss of separated fruits, both sides of the header assembly 60 are covered by expanded metal panels 196. The top of the header assembly 60 is covered by two expanded metal covers 198 and 200. Each of the expanded metal covers 198 and 200 is connected to the transverse header frame tube 98 by a hinge 197. This hinge 197 permits both expanded metal covers 198 and 200 to be opened for maintenance.

The tires and wheels 112 and 114 that support the front of the header assembly and follow the terrain as the harvester moves along a row of plants with fruit to be harvested are not steerable. It is therefore desirable to lift the tires and wheels 112 and 114 off the ground when turning around at the end of a plant row and when moving to or from a field to be harvested. It is also desirable to raise the front of the header assembly 60 when crossing obstructions such as an irrigation ditch or a grass water way for soil erosion control. If the tires and wheels 112 and 114 are permitted to follow the terrain into a depression, it is possible for the snout tips 142 and 144 to contact a bank on the far side of the depression and become buried. The header lift system includes a lift bar assembly 195. The lift bar assembly 195 includes a left bar 201 with a left connector plate 203 on its upper end and a right bar 205 with a right connector plate 207. The left connector plate 203 is clamped to a left bearing block and bearing 209 mounted on the transverse horizontal shaft 68 by bolts. The right connector plate 207 is clamped to a right bearing block and bearing 211 mounted on the transverse horizontal shaft 68. A first transverse cross bar 213 is welded to the left bar 201 and to the right bar 205 midway between the ends of both bars and holds the two bars parallel to each other and spaced apart. A pair of spaced apart ears 215 are welded to the first transverse cross bar 213. A second cross bar 217 is welded to the forward end of the left bar 201 and the right bar 205. The second cross bar 217 is parallel to the transverse horizontal shaft 68. A header hydraulic lift cylinder 219 has a rod end that is pivotally connected to the spaced apart ears 215, welded to the first cross bar 213 by a pivot pin 221. A pair of spaced apart ears 223, welded to the transverse horizontal tube 82 of the frame 12, are pivotally attached to a head end of the hydraulic lift cylinder 219. Extension of the hydraulic cylinder 219 pivots the left and right bars 201 and 205 about the horizontal shaft 68 and moves the second cross bar 217 into engagement with the bottom of the rigid header frame 62. Continued extension of the hydraulic cylinder 219 pivots the rigid header frame 62 and the left bar 201 and the right bar 205 together with the transverse header shaft 68 about the shaft axis and lifts the tires and wheels 112 and 114 off the ground. The tires and wheels 112 and 114 are lifted off the ground for crossing obstacles, for transport on roads and for making sharp turns.

The second cross bar 217 of the lift bar assembly 195 is lowered a selected distance below the rigid header frame 62 when harvesting fruit such as peppers. This permits the tires and wheels 112 and 114 follow the contour of the terrain and position the conical members 178 on the forward end of the left and right helix assemblies 168 and 170 at a selected elevation relative to plants with fruit that is being harvested.

A drum conveyor 202 is mounted on the frame 12 to the rear of the vertical tube members 38, 76 and 80 of the frame 12 that form a vertical mast. The drum conveyor 202 sits on a pair of left side drive rollers 204 and 206 on a horizontal axis parallel to the normal direction of forward movement. The left side driven rollers 204 and 206 are supported on a shaft 208 journaled in a bearing block 210 bolted to transverse horizontal tube 82 and a bearing block 212 bolted to rear transverse horizontal tube 90. The drum conveyor 202 also sits on a pair of right side driven rollers 214 and 216 on a horizontal axis parallel to the normal direction of forward movement. The right side driven rollers 214 and 216 are supported on a shaft 218 journaled in bearing block 220 and a bearing block 222. The bearing block 220 is mounted on an arm 224 welded to the transverse horizontal tube 82. The bearing block 222 is mounted on an arm 226 welded to the rear transverse horizontal tube 90. Rubber rollers 228 and 230 limit rearward movement of the conveyor drum 202. Rubber rollers 232 and 234 limit forward movement of the conveyor drum 202. Additional rollers can be provided to hold the conveyor drum in a vertical position. The rollers 228, 230, 232 and 234 have center bearings, a metal carrier wheel and a rubber periphery.

The drum conveyor 202 includes a cylindrical tube 236. A front wall 238 is fixed to the cylindrical tube 236 and extends radially inward from the cylindrical tube. A rear wall 240 is also fixed to the cylindrical tube 236 and extends radially inward from the cylindrical tube. A circular aperture 242 is provided through the front wall 238. A circular aperture 244 is also provided through the rear wall 240. A plurality of divider plates 246 extend from the front wall 238 to the rear wall 240 and radially inward from the cylindrical tube 236 to form fruit receiving pockets 248. The outer surface of the cylindrical tube 236 sits on the left side driven rollers 204 and 206 right side driven rollers 214 and 216. The left shaft 208 and attached left side driven rollers 204 and 206 are rotated by a hydraulic motor 250. The right shaft 218 attached to the right side driven rollers 214 and 216 is rotated by a hydraulic motor 252. Both hydraulic motors 250 and 252 work together to rotate the drum conveyor 202. The drum conveyor 202 can be rotated in a clockwise direction or in a counter clockwise direction by the hydraulic motors 250 and 252 as seen in FIG. 2.

Figure 3:
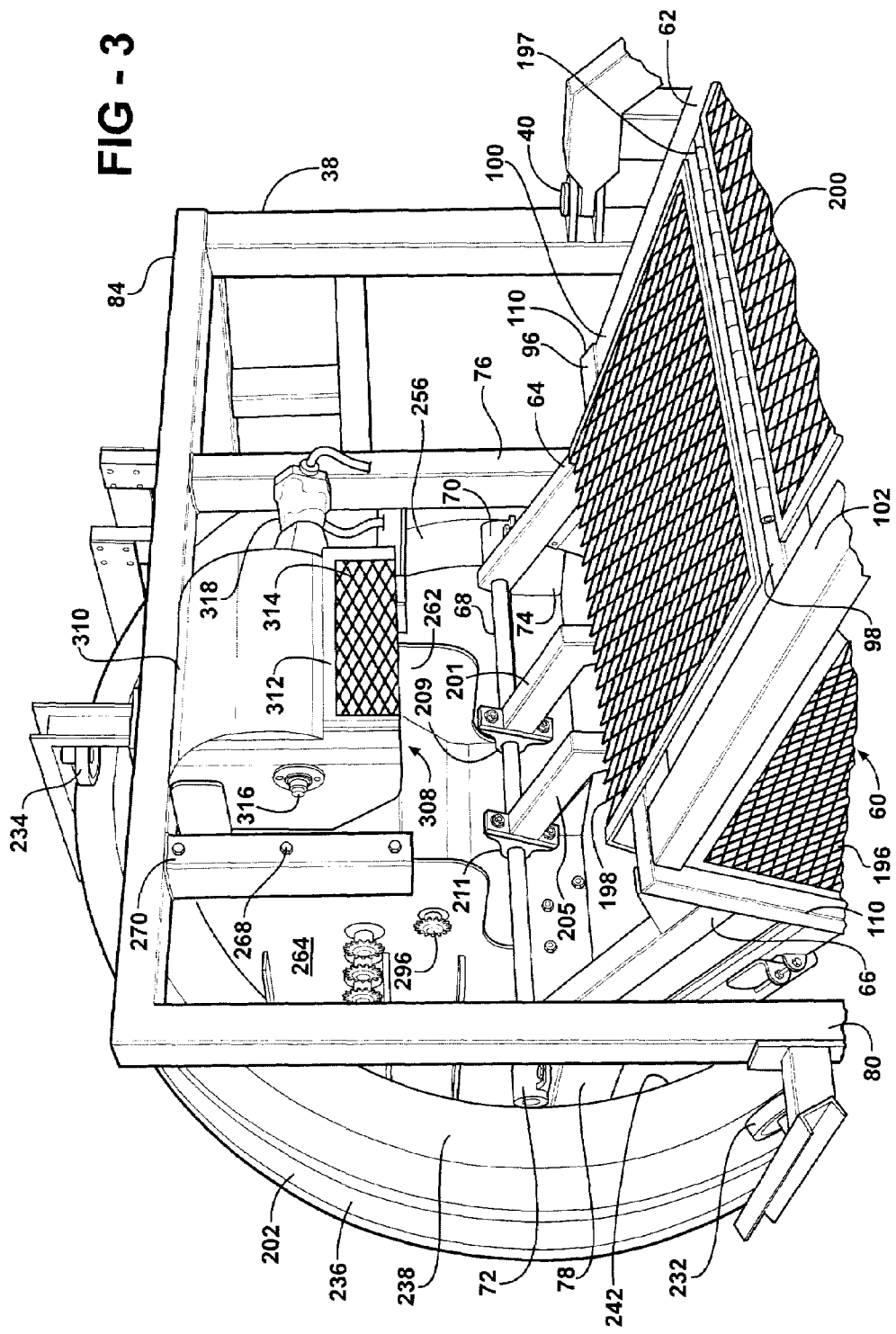
FIG. 3 is an enlarged perspective view showing the connection of the harvesting head and the upright frame assembly with parts broken away.

The right and left continuous belt and slat conveyors 190 and 192 convey harvested fruit through the circular aperture 242 through the front wall 238. A fixed plate 254 shown in FIG. 2, keeps fruit from passing through the circular aperture 244 through the rear wall 240 of the drum conveyor 202. Fruit discharged from right and left continuous belt and a slat conveyors 190 and 192, is directed into the fruit receiving pockets 248 in the drum conveyor 202. An arcuate fixed plate 256 starting at about forty five degrees from the bottom center of the drum conveyor 202 and extending from the front wall 238 to the rear wall 240 closes the fruit receiving pocket 248. The arcuate fixed plate 256 is on the left hand side of the drum conveyor 202 as shown in FIG. 3. An identical arcuate fixed plate 256 can be provided in the right hand side of the drum conveyor 202 if desired. The upper edge of the plate 256 is anchored to the frame 12. The drum conveyor 202 elevates harvested fruit up to the top of the drum conveyor and drops the fruit into a fruit separating and cleaning assembly 260. A fruit discharge from the drum conveyor is defined by the left vertical side wall 262, the right vertical sidewall 264 of the cleaning assembly and the front wall 238 and the rear wall 240 of the drum conveyor. The cylindrical tube 236 can be expanded metal or a metal band with apertures for discharge of foreign matter such as sand and water.

The separating and cleaning assembly 260 includes a left vertical side wall 262 and a right vertical side wall 264. The forward end of the left vertical side wall 262 is clamped by bolts 268 to a left vertical beam 266 that is welded to the transverse horizontal tube 84 of the frame 12 and extends downward. The forward end of the right vertical side wall 264 is clamped by bolts 268 to a right vertical beam 270 that is also welded to the transverse horizontal tube 84. Two bridge members 272 and 274, shown in FIG. 2, with horizontal beams 276 and integral vertical beams 278 on each end are welded to the vertical side walls 262 and 264. A plurality upper star wheel horizontal shafts 280 are journaled on the vertical side walls 262 and 264. The axies of the star wheel horizontal shafts 280 are in a common plane that extends rearward and upward. Each star wheel 282 has a plurality of generally radially extending resilient fingers 284 and a central bore 283 that receives the a star wheel horizontal shaft 280. A plurality of star wheels 282 are secured to each star wheel shaft 280 in side by side relationship and extend from the left side wall 262 to the right side wall 264. There is a space between the star wheels 282 on adjacent star wheel shafts 280 for the passage of fruit being cleaned.

A plurality of plate shafts 286 are journaled on the vertical side walls 262 and 264. The axies of the plate shafts 286 are parallel to each other and to the star wheel shafts 280. Plate assemblies 288 with a central hubs 290 and square shaft passages 292 are fixed to the plate shafts 286. A plate member 294 of each plate assembly 288 is preferably square and has four edge surfaces 285. The edge surfaces 285 impart vertically upward force on fruit and convey fruit in one direction. Plate members with other shapes can be used in place of the square plate members. These alternate plate assemblies may also have more than four edge surfaces. A plurality of plate assemblies 288 are mounted on each plate shaft 286 in side by side relation and extend from the left vertical side wall 262 to the right vertical side wall 264. The plurality of plate shafts 286 have axies that are all in a horizontal plane. The plate members 294 on each plate shaft 286 extend between the plate members on adjacent shafts 286.

A continuous roller chain 295 is trained around a drive sprocket 296 driven by a hydraulic motor. The continuous roller chain 295 is also trained across the top of sprockets 300 mounted on each star wheel shaft 280. A hold down bar or slide may be provided to hold the chain 295 in engagement with each sprocket 300 on each star wheel shaft 280. The continuous roller chain 295 is trained under a first idler sprocket 302 and across the top of sprockets 304 mounted on each plate shaft 286. Chain hold down sprockets 306 are provided to hold the continuous roller chain in engagement with the sprockets 304 mounted on each plate shaft 286. The continuous chain 295 runs from the forward chain hold down sprocket 306 to the drive sprocket 296. The drive sprocket is driven in a counter clock-wise direction as viewed in FIG. 2, by a hydraulic motor.

A cross flow fan 308 with a housing 310 is mounted on the forward end of the vertical side walls 262 and 264. An air intake 312 of the cross flow fan is covered by an expanded metal grate 314. The fan shaft 316 is driven by a hydraulic motor 318. Air discharged from the cross flow fan 308 passes through fruit discharged from the drum conveyor 202 and separates some leaves and other trash.

A hood 320 that covers the top of the fruit separating and cleaning assembly 260, is attached to the vertical side walls 262 and 264 and a transverse rear wall 322. The transverse rear wall 322 is fixed to the rear of the side walls 262 and 264. Air from the cross flow fan 308 carries leaves and other light weight plant material downward, between the rear wall 322 and the rear star wheel horizontal shaft 280, toward the ground.

The star wheels 282 on the star wheel horizontal shafts 280 let fruit pass through the space between the shafts and the star wheels. Large pieces of trash mixed with the crop material, received from the drum conveyor 202, are carried rearward and upward past the rear most star wheel shaft 280, discharged from the fruit separating and cleaning assembly 260 and fall to the ground. Fruit, such as chili peppers, that passes through the star wheels 282 on the star wheel shafts 280 fall to the plate assemblies 288 on the plate shafts 286. The space between the star wheel shafts 280 can be adjusted so that small fruit falls through first toward the front of the cleaning assembly and the largest fruit falls through the space between two star wheel shafts near the rear of the cleaning assembly. The rotating plate assemblies 288 on the plate shafts 286 have edge surfaces 285 and points 287 that engage fruit, throw the fruit upward and forward separating soil, sand, plant material, and other foreign matter from the fruit. Substantially all of the separated material passes between the plate members 294 and to the ground.

A transverse conveyor assembly 330 includes a conveyor trough 332 and a continuous conveyor belt 334. The continuous belt 334 is trained around a lower idler roller 336 and a driven roller 338. The driven roller 338 is driven by a hydraulic motor 340. The idler roller 336 is adjusted by adjustment screws 342 to tension the continuous conveyor belt 334. The conveyor trough 332 of the transverse conveyor assembly 330 receives cleaned fruit from the forward plate shaft 286 and attached plate assemblies 288 of the fruit separation and cleaning assembly 260. The continuous conveyor belt 334 conveys the fruit received in the conveyor trough 332 to a discharge conveyor hopper 344 of a discharge conveyor assembly 346.

The discharge conveyor assembly 346 includes a lower conveyor trough 348 secured to a support cradle 350. The cradle 350 includes two plate members 352 and 354 secured to the lower portion of the lower conveyor trough 348. The discharge conveyor hopper 344 is secured to the plate members 352 and 354. A vertical beam 356 is welded to the plate 352. A vertical beam 358 is welded to the plate 354. A horizontal beam 360 has one end clamped to the vertical beam 356 and another end clamped to an upper portion of the lower conveyor trough 348. A second horizontal beam 362 has one end clamped to the vertical beam 358 and another end clamped to an upper portion of the lower conveyor trough 348. An upper yoke 364 is welded to the vertical beams 356 and 358 midway between the plate members 352 and 354 and the first and second horizontal beams 360 and 362. An upper trunnion assembly 366 pivotally attaches the yoke 364 to a horizontal beam 368 for pivotal movement about a vertical axis. The horizontal beam 368 is attached to the top of the vertical tube 38 and extends rearward from the vertical tube of the frame 12. A lower yoke 370, shown in FIG. 7, is welded to the vertical beams 356 and 358 below the upper yoke 364. A lower trunnion assembly 372 pivotally attaches the lower yoke 370 to a horizontal beam 374 for pivotal movement about the same vertical axis as the upper trunnion assembly 366. The horizontal beam 374 is welded to the bottom end of a vertical tube 376 and to the vertical tube 38 of the frame 12. A plate 378, welded to the top of the vertical tube 376, is clamped to the horizontal beam 368 by a plurality of bolts 380 that pass through an upper plate 382 and a lower plate 378. A hydraulic cylinder 384 is pivotally attached to an ear 386 on the vertical tube 38 by a pivot pin 388 and to an ear 390 on the vertical beam 356 by a pivot pin 392. The hydraulic cylinder 384 is operable to pivot the discharge conveyor assembly 346 more than ninety degrees about the vertical axis of the upper trunnion assembly 366 and the lower trunnion assembly 372.

Figure 1:
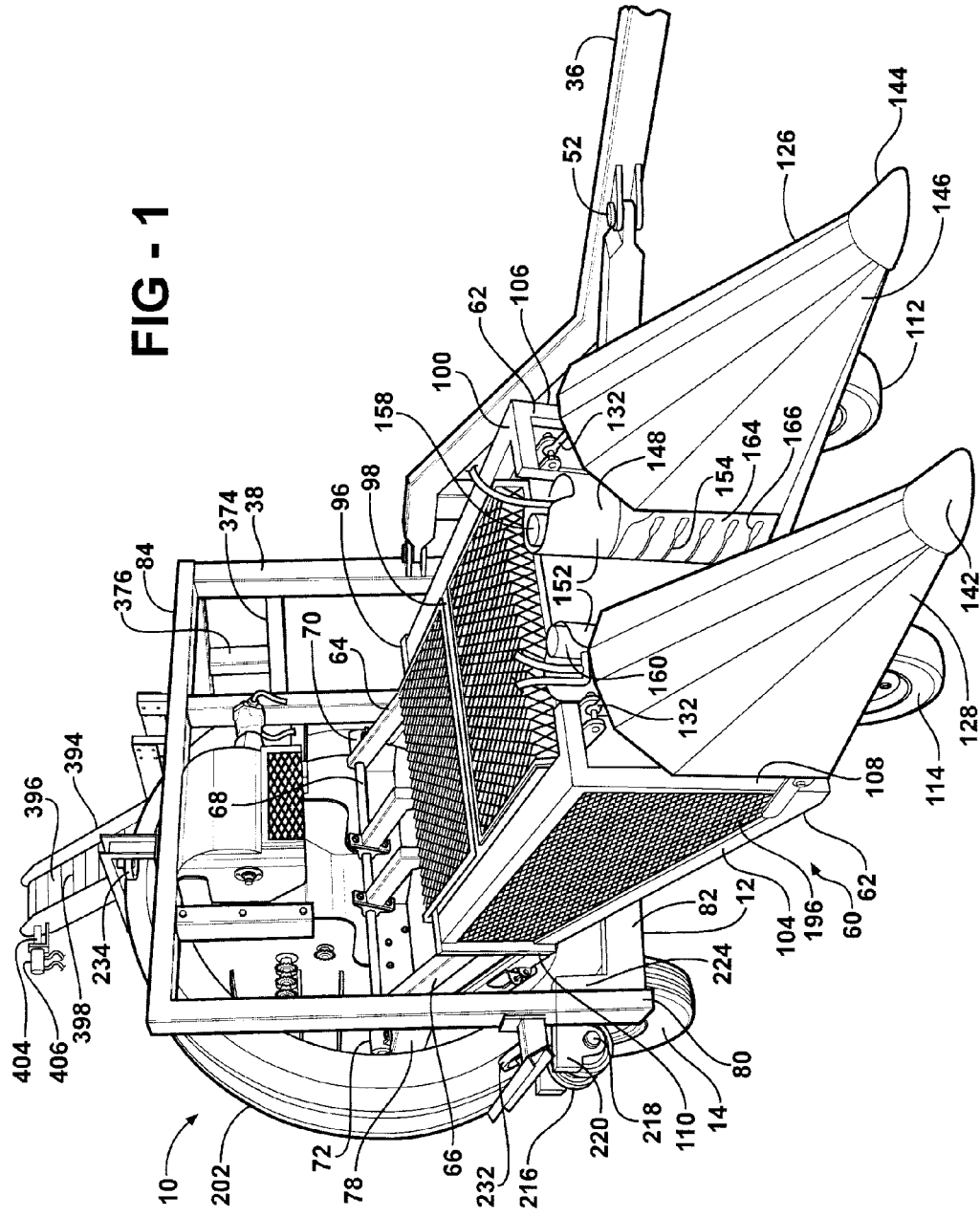
FIG. 1 is a perspective view showing the front and right hand side of the harvester with parts broken away.
Figure 4:
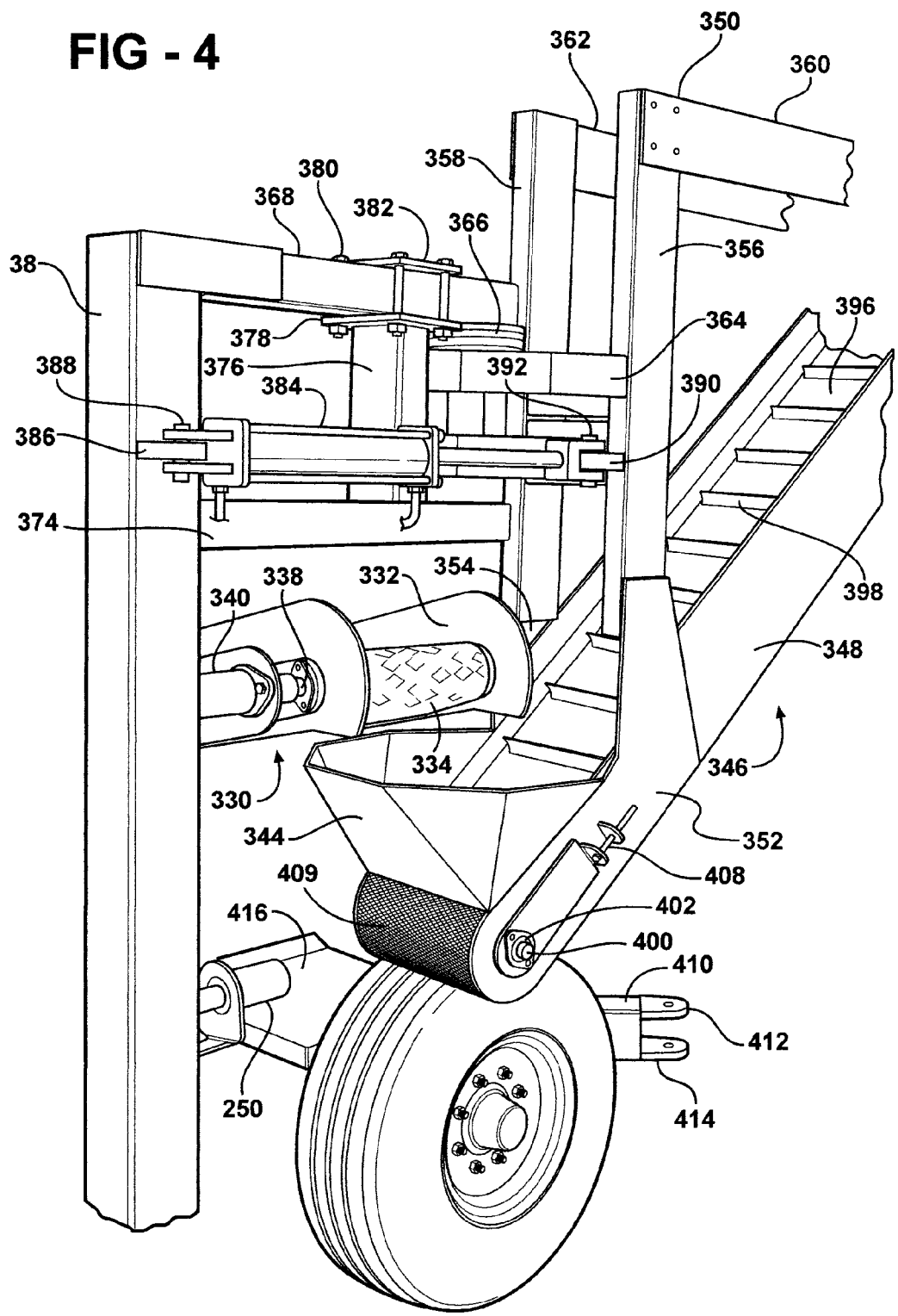
FIG. 4 is a perspective view of the transverse conveyor discharge end and the pivotally mounted discharge conveyor with parts broken away.

An upper conveyor trough 394 is pivotally attached to the upper end of the lower conveyor trough 348. The pivot connection permits the upper conveyor trough 394 to be moved to a transport or storage position as shown in FIG. 7. During harvesting operations in the field, the upper conveyor trough 394 is clamped in a position in which it extends upward and outward from the upper end of the lower conveyor trough 348 at the same angle as the lower conveyor trough as shown in FIG. 1. A continuous conveyor belt 396 with slats 398 that hold and convey fruit is shown in FIG. 4 and FIG. 1. The continuous conveyor belt 396 is trained around a lower roller 400 supported by bearings 402 and an upper roller 404. The upper roller 404 is driven by a hydraulic motor 406. The lower roller 400 is moved by an adjustment screw 408 to apply the desired tension on the continuous belt 396. The discharge conveyor assembly 346 is shown in FIG. 7 with the conveyor belt 396, the lower roller 400 and the upper roller 404 removed. A screen 409 is provided on the lower end of the lower conveyor trough for separation of sand and dirt. This screen 409 extends part way around the lower roller 400 and attaches to a lower edge of the discharge conveyor hopper 344.

The harvested fruit can be collected in a container moving in the same direction as the harvester 10 and to the left side of the harvester. The container is either on a self propelled vehicle or pulled by a separate tractor. When delivering fruit moving along on the left side of the harvester 10, the hydraulic cylinder 384 is retracted and the discharge conveyor 346 extends laterally to the left side of the harvester. The harvested fruit can also be delivered to a container on a trailer pulled behind the harvester 10. A hitch beam 410 is welded to fore and aft tubes 92 and 94 as well as to the horizontal transverse tube 18. A trailer tongue is attached to tongues 412 and 414 extending rearward from hitch beam 410. The hydraulic cylinder 384 is extended so that the discharge conveyor 346 extends rearward and upward to discharge fruit into a trailer towed behind the harvester 10.

Some crops harvested by the harvester 10 include some fruit or other plant material that is considered undesirable. A platform 416 and a guard rail 418 that are both attached to the frame 12 form a work station for a person to sort material on the continuous conveyor belt 334 between the fruit separation and cleaning assembly 260 and the discharge conveyor assembly 346. The person working on the work station would observe the harvested fruit conveyed on the belt 334 and separate undesirable material by hand.

The fruit separating and cleaning assembly 260 works well for some crops. For other crops a different cleaning and separating assembly may be desirable. The cleaning assembly 260 can be changed quickly by disconnecting two hydraulic motors and removing the bolts 268.

During operation of the harvester 10, the main draft tube 36 of the hitch assembly 34 is attached to a towing tractor. The hitch assembly 34 is adjusted to position the header assembly 60 to the right of the tractor. The header assembly is centered on the row of plants to be harvested. The tires and wheel assemblies 14 are to be positioned to roll on the ground on opposite sides of the row to be harvested. Both wheels 14 should be centered between the row of plants to be harvested and adjacent plant rows. The tractor tires should be centered to roll on the ground between plant rows and to the left on the plant row to be harvested. A trailer or other vehicle, for receiving harvested fruit, should have wheels that run on the ground between plant rows. The hydraulic motors are connected to a source of hydraulic fluid powered by the towing tractor. A hydraulic pump that provides the hydraulic fluid can be mounted on the harvester 10 or on the tractor. The front of the header assembly 60 is lowered to move the tire and wheels 112 and 114 into ground engagement. The tires and wheels 12 and 14 support a substantial portion of the total weight of the header assembly.

As the harvester 10 is moved forward by the tractor, the snout tips 142 and 144 move along the ground surface and lift low fruit. The snout assemblies 126 and 128 continue to lift plant material and guide the plant material toward the plant feed assemblies 148 and 150. The plant material feed fingers 156 move plant material between the cylindrical tubes 152 and the helix assemblies 168 and 170. As the plant stalks enter the slot between the inboard metal edges 188, the helixes 182 formed by steel rods engage low plant fruit. As the plants progress into the passage between the inboard metal edges 188 the helixes 182 engage fruit higher up on the plants. The plants pass through the slot between the inboard metal edges 188 by the time they reach the cylindrical tubes 184 of the helix assemblies 168 and 170. Each helix 188 lifts fruit that is contacted upward, outward and rearward and removes mature fruit from the plant. The fruit severed from plants by the helix assemblies 168 and 170 is deposited on continuous belt and slat conveyors 190 and 192. These conveyors 190 and 192 convey the fruit rearward and upward. The fruit is discharge from the conveyors 190 and 192 into fruit receiving pockets 248 in a drum conveyor 202. The drum conveyor 202 elevates the fruit and drops the fruit into a fruit separating and cleaning assembly 260.

A cross-flow fan 308 blows air through a stream of fruit falling into the fruit separating and cleaning assembly 260. A hood 320 directs air from the cross flow fan 308 and light weight entrained material rearward and downward out of the separating and cleaning assembly 260. The fruit and heavier foreign material lands on a bed of star wheels 282 on star wheel horizontal shafts 280. The star wheel horizontal shafts 280 rotate to move plant material rearward. The fruit falls downward between the star wheels 282 and the star wheel shafts 280. Large pieces of crop material are moved to the rear of the rear most star wheel shaft 280 and fall out of the fruit separating and cleaning assembly 260 together with the air and light foreign material. The fruit that passes through the space between star wheel horizontal shafts 280 lands on a bed of plate shafts 286 and plate assemblies 288. The rotating plate assemblies 288 throw fruit upward and forward. Dirt, sand and other foreign material falls away from the fruit, moves between the rotating plate assemblies 288 and falls to the ground.

Cleaned fruit discharged from the fruit separating and cleaning assembly 260 is deposited on a transverse conveyor assembly 330. The transverse conveyor assembly 330 moves the fruit toward the discharge conveyor 346 system on the left hand side of the harvester 10. The discharge conveyor 346 elevates fruit and deposits the fruit in a moving container on the left side of the harvester or in a container pulled behind the harvester.

Occasionally there is an irrigation ditch or other obstruction to cross. Either tire and wheel 112 or 114 can support the front of the header assembly 60 with a rigid frame 62 while the other tire and wheel is up in the air.

Upon reaching the end of a plant row, the front of the header is raised off the ground to a road transport position while the harvester is turned around and lined up with another row of plants to be harvested. The front of the header assembly 60 is then lowered to let the non-steerable tires and wheels 112 and 114 support the front of the header assembly and follow the terrain.

The disclosed embodiments are representative of a presently preferred form of the invention, but are intended to be illustrative rather than definitive thereof. The invention is defined in the claims.

I claim:

1. A pull type pepper harvester comprising:
   a frame;
   a right side axle tube and spindle telescopically received in a horizontal transverse tube of the frame and locked in one of a plurality of selectable transverse positions relative to the frame, a left side axle tube and a spindle telescopically received in the horizontal transverse tube of the frame and locked in one of a plurality of selectable transverse positions relative to the frame, a right tire and wheel journaled on the right side axle tube and spindle, a left tire and wheel journaled on the left side axle tube and spindle;
   a hitch assembly including a main draft tube with a draft tube rear portion pivotally attached to the frame by at least one pin for pivotal movement about a vertical axis, a draft tube forward portion adapted to be connected to a tractor, and an adjustable length strut pivotally attached to the frame and to the main draft tube, that is extended to increase length to hold the main draft tube in a harvesting position and that is retracted to decrease length and hold the main draft tube in a transport position;
   a header assembly including a rigid header frame with a header frame rear portion pivotally attached to the frame for pivotal movement about a transverse horizontal axis, a left side ground engaging tire and wheel mounted on a header frame front portion of the rigid header frame adjacent to a rigid header frame left side and vertically adjustable relative to the rigid header frame, a right side ground engaging tire and wheel mounted on the header frame front portion of the rigid header frame adjacent to a rigid header frame right side and vertically adjustable relative to the rigid header frame, a left snout assembly and a right snout assembly pivotally mounted on the rigid header frame, a left plant feed assembly and a right plant feed assembly mounted on the header frame front portion and cooperating with each other to urge crop plants from the left snout assembly and the right snout assembly to the rear, a left helix assembly journaled on the rigid header frame by a left rear bearing and extending downward and forward from the left rear bearing, a right helix assembly journaled on the rigid header frame by a right rear bearing and extending downward and forward from the right rear bearing and in a common plane with the left helix assembly and spaced from the left helix assembly, a left expanded metal grate under the left helix assembly with an outboard edge fixed to the rigid header frame and an inboard metal edge that forms a left side of a plant passage through the header assembly and a right expanded metal grate under the right helix assembly with an outboard edge fixed to the rigid header frame and an inboard metal edge that forms a right side of the plant passage through the header assembly, a left continuous belt and slat conveyor mounted on the rigid header frame to the left side of the left helix assembly, a right continuous belt and slat conveyor mounted on the rigid header frame to the right side of the right helix assembly, and a left expanded metal side panel and a right expanded metal side panel and at least one expanded metal top cover that retain and deflect fruit separated from plants by the left helix assembly and the right helix assembly into the left continuous belt and slat conveyor and the right continuous belt and slat conveyor;
   a header lift assembly including a header hydraulic lift cylinder connected to the frame and to the rigid header frame through a linkage;
   a drum conveyor including a cylindrical tube, a conveyor front wall with a circular aperture fixed to the cylindrical tube, a conveyor rear wall with a circular aperture fixed to the cylindrical tube, a plurality of divider plates connected to the conveyor front wall and the conveyor rear wall to form a plurality of fruit receiving pockets that receive fruit from the left continuous belt and slat conveyor and the right continuous belt and slat conveyor, a left side driven roller and a right side driven roller journaled on the frame, supporting the cylindrical tube and rotating the cylindrical tube to elevate fruit in the plurality of fruit receiving pockets, a fixed arcuate plate closing a radially inward facing opening of the plurality of fruit receiving pockets to retain fruit in each of the plurality of fruit receiving pockets from a location past a fruit receiving location to a fruit discharge position;
   a fruit separating and cleaning assembly including a left vertical side wall and a right vertical side wall extending through the circular aperture through the conveyor rear wall and through the circular aperture through the conveyor front wall of the drum conveyor, clamped to a vertical frame portion of the frame and extending rearwardly from the vertical frame portion, a transverse rear wall fixed to the left vertical side wall and to the right vertical side wall, a hood covering the area between the left vertical side wall and the right vertical side wall and extending forward from the transverse rear wall, a plurality of horizontal star wheel shafts each of which is journaled on the left vertical side wall and the right vertical side wall, are parallel to each other, a plurality of star wheels mounted on each of the plurality of star wheel shafts, a fan connected to the left vertical side wall and the right vertical side wall that discharges air through fruit discharged from the drum conveyor and under the hood, a plurality of plate shafts journaled on the left vertical side wall and the right vertical side wall below the plurality of horizontal star wheel shafts, a plurality of plate assemblies mounted on each of the plurality of plate shafts and wherein a plate of each of the plurality of plate assemblies on each of the plurality of plate shafts extends the between the plates of the plurality of plate assemblies mounted on each adjacent one of the plurality of plate shafts, an endless drive chain driven by a hydraulic motor drive sprocket and trained around a star wheel driven sprocket on each of the plurality of star wheel shafts and a plate assembly driven sprocket on each of the plurality of plate shafts, and a trash discharge passage between a rear star wheel shaft of the plurality of horizontal star wheel shafts and the transverse rear wall;
   a transverse conveyor assembly mounted on the frame below a forward plate shaft of the plurality of plate shafts and including a transverse conveyor discharge end;

a fruit discharge conveyor pivotally mounted on the frame for pivotal movement about a vertical discharge conveyor axis, including a discharge conveyor hopper under the transverse conveyor discharge end and a hydraulic cylinder connected to the frame and the fruit discharge conveyor operable to pivot the fruit discharge conveyor about the vertical discharge conveyor axis.

2. A pull type pepper harvester, as set forth in claim 1, wherein the left snout assembly covers the left side ground engaging wheel, the right snout assembly covers the right snout assembly, a left adjustable slider assembly limits downward movement of a left snout tip and permits the left snout tip to move upward over obstructions, and a right adjustable slider assembly limits downward movement of the right snout tip and permits the right snout tip to move upward over obstructions.

3. A pull type pepper harvester, as set forth in claim 1, wherein the header lift assembly includes the header hydraulic lift cylinder with a lift cylinder rod end pivotally connected to a lift bar assembly, the lift bar assembly has a lift bar upper end journaled on a transverse horizontal shaft with the transverse horizontal axis and a lower end cross bar of the lift bar assembly that engages the rigid header frame during extension of the header hydraulic lift cylinder and lifts the left side ground engaging tire and wheel and the right side ground engaging tire and wheel from the ground and wherein retraction of the header hydraulic lift cylinder lowers the left side ground engaging tire and wheel and the right side ground engaging wheel and tire to the ground and disengages the lower end cross bar from the rigid header frame.

4. A pull type pepper harvester, as set forth in claim 3, wherein the header frame rear portion is attached to and supported by the transverse horizontal shaft.

5. A pull type pepper harvester, as set forth in claim 4, wherein the transverse horizontal shaft is journaled on the vertical frame portion of the frame.

6. A pull type pepper harvester, as set forth in claim 1, including a left helix fron support bearing supported by the rigid header frame and supporting a forward end of the left helix assembly, and a right helix front support bearing supported by the rigid header frame and supporting a forward end of the right helix assembly.

\* \* \* \* \*